March 9, 1937.  B. WILLACH ET AL  2,072,916
SPECIFIC GRAVITY INDICATOR FOR STORAGE BATTERIES
Filed June 20, 1933  2 Sheets-Sheet 1
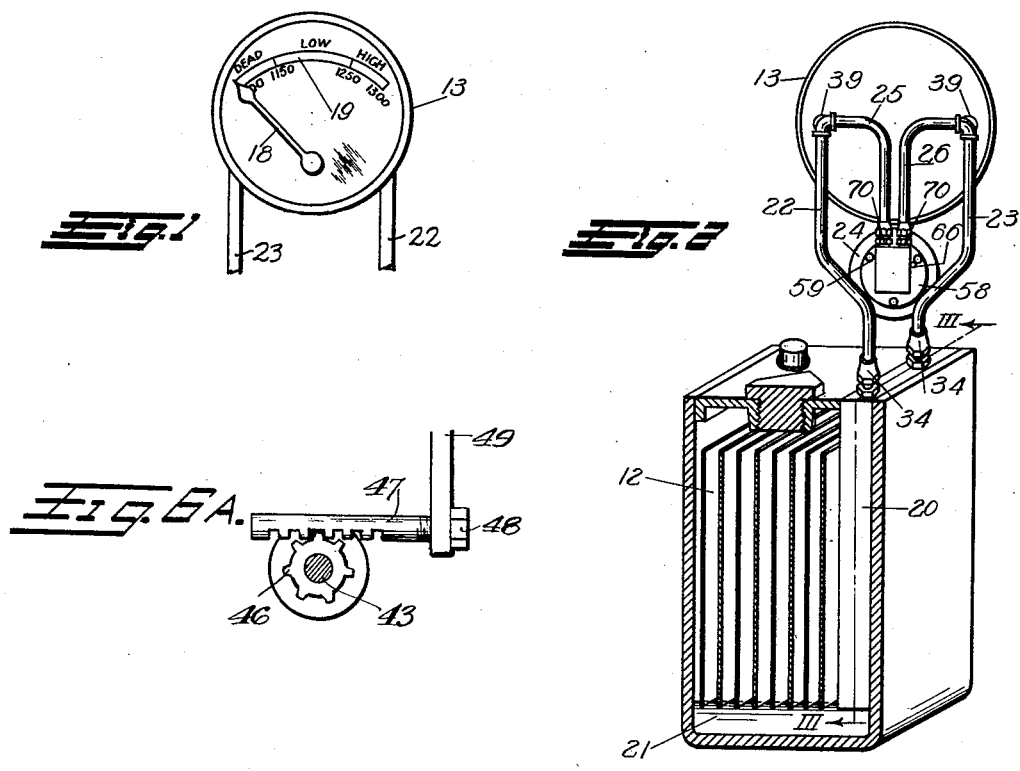
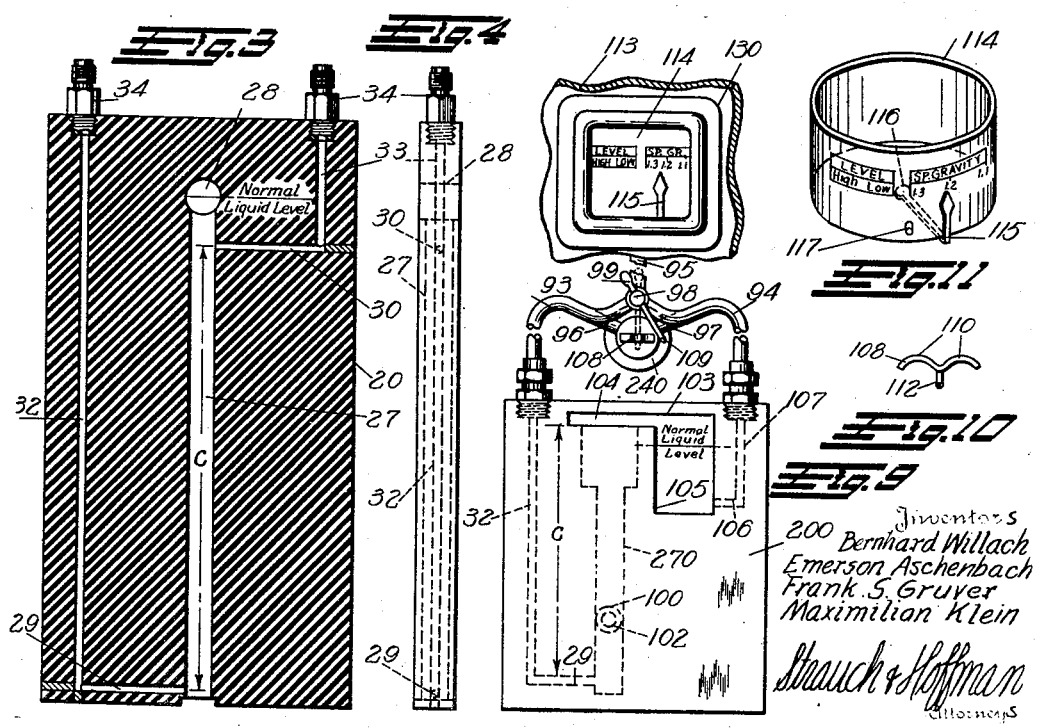
Inventors
Bernhard Willach
Emerson Aschenbach
Frank S. Gruver
Maximilian Klein
Strauch & Hoffman
Attorneys March 9, 1937.　　　B. WILLACH ET AL　　　2,072,916
SPECIFIC GRAVITY INDICATOR FOR STORAGE BATTERIES
Filed June 20, 1933　　　2 Sheets-Sheet 2
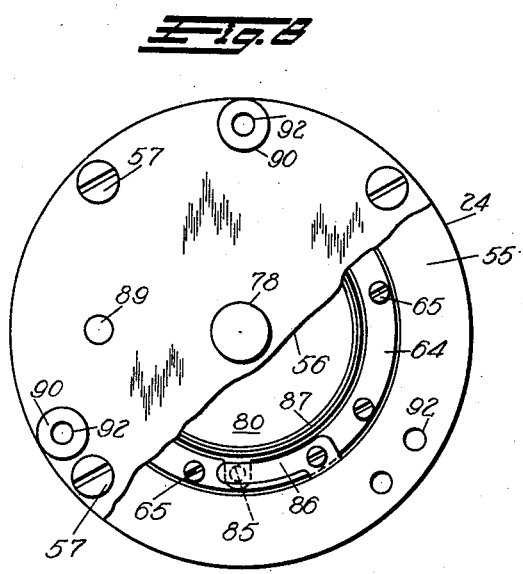
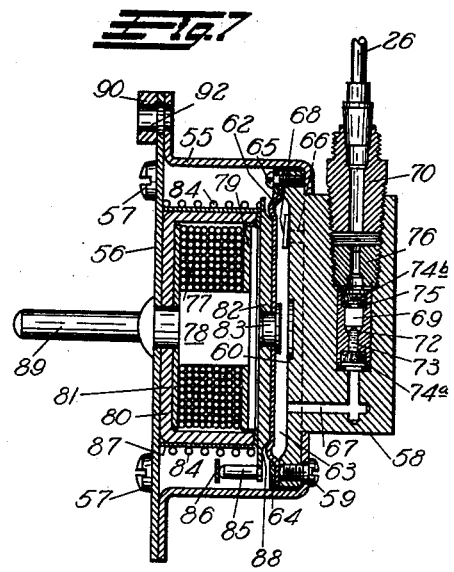
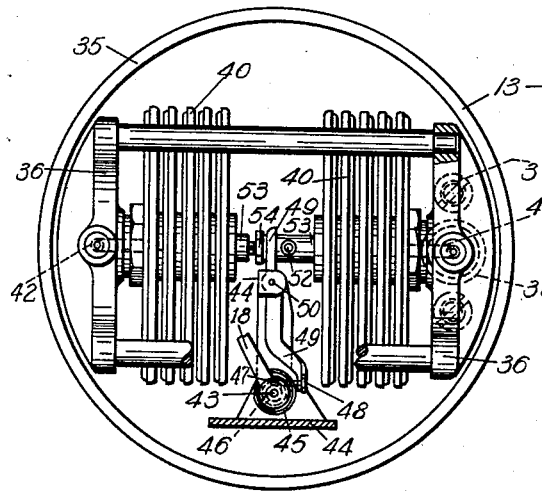
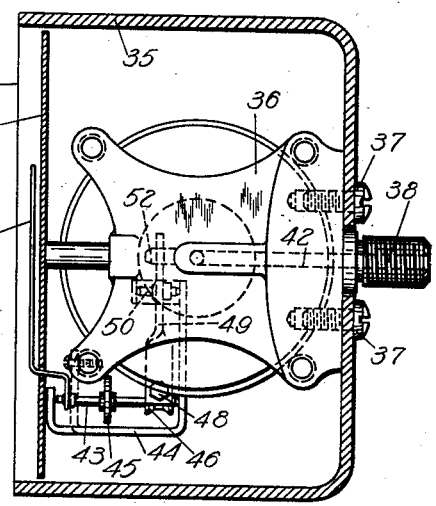
Inventors
Bernhard Willach
Emerson Aschenbach
Frank S. Gruver
Maximilian Klein
Strauch + Hoffman
Attorneys Patented Mar. 9, 1937

2,072,916

UNITED STATES PATENT OFFICE 2,072,916

SPECIFIC GRAVITY INDICATOR FOR STORAGE BATTERIES

Bernhard Willach, Emerson Aschenbach, Frank S. Gruver, and Maximilian Klein, Sellersville, Pa., assignors to United States Gauge Company, New York, N. Y., a corporation of Pennsylvania Application June 20, 1933, Serial No. 676,746

16 Claims. (Cl. 265—44)

This invention relates to systems for indicating the densities and/or levels of liquids. More particularly, the present invention is concerned with methods and means for obtaining quick and convenient readings on the conditions existing in storage batteries of the conventional rechargeable type containing liquid electrolyte.

The primary object of this invention is to devise new and improved systems for indicating the specific gravity of a liquid and in this respect it is closely related to the invention disclosed in our copending application Serial No. 617,646, filed June 16th, 1932. In that application we disclosed a system embodying a constant head of battery electrolyte acting through an air column upon the pressure-responsive element of a gauge. The effective liquid head was maintained constant by keeping its level constant and by pumping additional air to the air column so that said column would always have one end disposed at a fixed depth in the liquid.

The present invention involves certain modifications and improvements over that just discussed, and further contemplates the provision of a system,—separate and distinct from the gravity system if desired, but preferably intertied therewith for economy and compactness—, for indicating liquid levels.

It is a major object of the present invention to devise an accurate indicator of liquid densities embodying a differential pressure gauge connected into the liquid at two definitely spaced points to form a fixed liquid head or column. A more specific phase of this object resides in the provision of a special unit for insertion in the liquid to establish said spaced points.

Another object of this invention is to provide, in any indicating system embodying a conduit terminating below the surface of a liquid to form a pressure-transmitting gaseous column, a suitable means for maintaining the line completely filled with gas. In carrying out this object it is a further important object to prevent bubbles of gas from collecting at the submerged outlet of the conduit and affecting the accuracy of the indications. It is also an object to devise a new and useful pump adapted for this and other purposes.

A further object is to provide a novel gauge, particularly adapted for use in the systems of this invention, which has its action suppressed or controlled so that it registers indications only over a dial scale that represents a range of values all of which are above zero. The scale range may be smaller than a range of values between zero and the lower end of the scale, as will hereinafter appear.

It is another major object of the present invention to devise a combined level and density indicating system having a maximum of compactness and a minimum number of parts by virtue of utilizing certain of the elements of the combination in dual capacity. In this connection it is an object to provide novel selecting means for obtaining either indication at will, and, if desired, to utilize the selecting means for automatically calibrating or adjusting the system during the selecting operation.

A further object of our invention is to devise special units for connecting gauges with liquids which are to be kept under observation.

The foregoing and other important objects of the present invention will fully appear upon a study of the following detailed description and appended claims when taken in conjunction with the accompanying drawings, wherein:

Figure 1 is a front elevational view of an indicator that may be used with the apparatus of the present invention.

Figure 2 is a view of the preferred form of density indicating system of the invention, with the battery illustrated in sectioned perspective and the indicating instrument in rear elevation.

Figure 3 is a vertical central section taken through the battery unit of the system on the plane of the line III—III in Figure 2.

Figure 4 is a side elevational view of the battery unit of Figure 3.

Figure 5 is a face view, with parts removed for clarity, of the gauge seen in the systems of Figures 1 and 2.

Figure 6 is an irregular vertical central section taken on the gauge of Figure 5 but showing certain parts thereof in elevation.

Figure 6A is a fragmental sectional view of the gauge shown in Figure 6 and illustrates the pointer shaft actuating mechanism.

Figure 7 is a vertical section taken centrally of the special low pressure pumping device that is seen in rear elevation in the system of Figure 2.

Figure 8 is a front elevational view of the pump of Figure 7 with a portion of the cover plate broken away to show some of the internal details.

Figure 9 is a somewhat diagrammatic view, with parts not necessarily in proportion, of a further modified form of system designed to provide selective remote indications of both the density and the level of a body of liquid.

Figure 10 is an enlarged edgewise view of one of the details of Figure 9.

Figure 11 is a view in perspective of a suitable indicating scale and pointer for use in the gauge of the system of Figure 9.

With continued reference to the drawings, wherein like numerals are employed to designate like parts, the system comprises a storage battery 12, a differential gauge 13, and a pair of conduits 22 and 23 for connecting the pair of pressure-responsive elements of the gauge (shown in detail in Figures 5 and 6 and later described) with the battery electrolyte. The ends of the conduits are immersed in the liquid with the planes of their lower surfaces or openings vertically spaced apart in fixed relationship as indicated by the constant column or distance "C" (Figure 3). The conduits are filled with a gas such as air so that none of the electrolyte enters the conduits. As was pointed out in said earlier copending application, this condition may be maintained by pumping air into the lines, and of course any excess air will merely escape from the conduits and bubble up through the liquid.

A constant head or column "C" of liquid is thus obtained in spite of variations in the liquid level, and it serves the same purpose as that which was obtained in said copending application by maintaining a constant level in a special compartment of the battery cell, inserting a single conduit to a fixed depth below the constant level and transmitting the pressure created by the fixed column of liquids to a gauge having a single pressure-responsive element. In the present system the use of two conduits eliminates the need for the special battery compartment, and variations in the electrolyte level will create no errors in the reading of the gauge because such variations will have precisely the same pressure effect upon each of the transmitting air columns of the conduits.

A preferred form of density or specific gravity system is fully illustrated in Figures 2 to 8, where-in Figure 2 discloses the complete system or combination and the other views disclose suitable parts therefor. The system comprises a battery or one cell of a battery, 12; a differential gauge 13; a special unit 20 that may be formed with or built into the battery; a pair of conduits 22, 23 for interconnecting the unit 20 with the gauge; and a small low-pressure pump 24 designed to maintain the conduits 22, 23 filled with atmospheric air through a pair of pipes 25, 26 respectively, coupled between the pump and said conduits.

With particular reference to Figures 3 and 4, the special battery unit 20 consists, by way of illustration, of a rectangular plate of hard rubber or any other material that will resist destruction by the electrolyte. The plate may be disposed in any part of the battery and it may be formed as an integral part of the electrolyte receptacle, but preferably it is built and sealed into the battery as a unitary fixed part of the completed sturdy assembly and so disposed, as seen in Figure 2, that its upper end is substantially flush with the top of the battery and its lower end is spaced from the bottom of the electrolyte receptacle by the usual transverse ribs 21 which support the lead plates. In a battery of one or more cells, the indicating system may be used for each cell, but preferably a unit 20 is inserted in only one cell of a battery of several cells. The arrangement of Figure 2 permits the use of standard parts throughout with the exception of the one enlarged electrolyte receptacle.

The rubber plate 20 has a vertical chamber 27 which is intersected by a transverse passageway 28 at about the normal electrolyte level, and the liquid levels are equalized in the chamber and in the cell because the chamber opens downwardly into the latter. A pair of substantially horizontal passages 29 and 30, intersect the chamber 27 at points which are definitely spaced apart by the distance "C", which corresponds to the constant spacing previously described. The passage 29 is connected to one side of the differential gauge 13 by a conduit comprising an intersecting passageway 32, a coupling member 34 secured in the top of the plate and the pipe 22 which is connected between the coupling member and the gauge. In like manner the passage 30 is connected to the other side of the gauge by a passageway 33, a coupling 34 and the pipe 23. These complete conduits are of course kept filled with air by the pump 24 (later described).

The structure just described forms a very satisfactory and convenient arrangement for obtaining a constant head or column of electrolyte which, as it varies in specific gravity, will impress corresponding variations in pressure upon the gauge. There is always assured a fixed relationship between the passages 29 and 30. The specific gravity of the electrolyte in the chamber 27 is truly representative of that in the cell, even when the level falls below the cross bore 28, because the air which is pumped into the system prior to each reading will bubble upwardly through the column and assist in circulating the electrolyte.

The pump is operated for each reading because it is necessary, in order to obtain exact specific gravity indications, that the column of liquid "C" remain of constant volume. If the line were not urged frequently, some of the air would be absorbed by the liquid from the conduits and be replaced by electrolyte to thus effect the pressures exerted on the air columns. Also, temperature variations may cause the air columns to shorten and permit liquid to enter the passages 29 and 30.

The passages 29 and 30 of Figure 3 are preferable over the bells of the prior art, for the reason that large air bubbles will frequently form and enlarge at the bell mouths to such extent before breaking that they will bulge slightly into the liquid to cause a material change of the constant column "C", whereas the passages 29 and 30 are so shaped and disposed as to prevent the occurrence of this phenomenon and its attendant production of error in the specific gravity readings on the gauge.

The differential gauge 13, as best illustrated in Figures 5 and 6, comprises a casing 35; a framework consisting of a pair of rigidly interconnected end plates 36, secured to the casing by screws 37, and provided with connections 38 for receiving a pair of three-way couplings 39 (Figure 2); a pair of aligned bellows 40, one secured to each plate 36 and designed to expand toward the other, and each being in communication with its corresponding coupling 39 by way of a passage 42 through the plate 36; a scaled dial 19; an indicating pointer 18 adapted to swing over the scale of the dial; and mechanism for transmitting the resultant bellows movement to the pointer, as follows:

The transmitting mechanism comprises a pointer shaft 43, which is rotatably carried at its ends in a bracket 44 secured to the gauge framework; a light torsional spring 45 tending to urge the shaft and its pointer to the illustrated position; a small spool or pinion 46 secured upon the rear end of the shaft and in peripheral engagement with the rack end 47 of a screw 48; a lever 49 pivoted between its ends at 50 upon the bracket 44; and an actuating pin 52 designed to engage the upper end of the lever. The pin 52 projects laterally from a rod 53 which rigidly interconnects the inner ends of the two bellows. The rod is adjustable in length by virtue of a nut 54, the purpose of which is to vary the tension between the pair of bellows.

As is obvious, when the pin 52 is thrust against the upper arm of the lever 49 in response to pressure variations, the lever will be swung about its pivot to oscillate the pointer shaft in a clockwise direction in Figure 5 against the resistance of the spring 45. The right-hand bellows of Figure 5 is connected to the lower end of the column "C", so that this movement occurs when there is an increase in the specific gravity of the liquid under observation. The pin 52 is shown in the position which it occupies relative to the lever 49 when the gauge is out of the system, i. e., when both bellows are open to atmosphere and the differential pressure is zero. However, when the gauge is in actual use, its design and adjustment are such that the pin has just made contact with the upper end of the lever after it has been connected to a column "C" having a predetermined minimum density, for example, a column of electrolyte having a specific gravity of 1.100. This characteristic is obtained as follows:

In the illustrated system, let it be assumed that the length of the constant column "C" is 8½ inches. The pressure caused by the weight of pure water in such a column would be 0.307 pounds per square inch; the pressure caused by electrolyte having a specific gravity of 1.100, would be 0.337 pound; and the pressure produced by electrolyte, having a specific gravity of 1.300, would be 0.399 pound. Hence if the gauge were permitted to give readings from zero to the maximum pressure of 0.399 pound, there would be required a greatly elongated scale consisting of two parts, viz., a long useless part between zero and 0.337 pound, and a useful and relatively short part between 0.337 pound and 0.399 pound. Such a scale would be highly undesirable and accordingly the scale of the present invention is made in clearly visible size and with its complete range between the values 0.337 pound and 0.399 pound, this being permitted by the above described lost motion between the pin 52 and the lever 49. With such a design the pressure variations between zero and 0.337 pound require no scale as they do not cause pointer actuation, but when the gauge is connected to the battery unit 20 and the latter is immersed in the electrolyte, the moving bellows will pick up the transmitting mechanism and pointer when 0.337 pound pressure is reached and then swing the pointer sufficiently over the scale to indicate the actual specific gravity of the electrolyte.

With reference to Figures 2, 7 and 8, the preferred form of pump 24, for incorporation in the system comprises an electrically operated diaphragm for drawing air from the atmosphere and feeding it into the pipes which are connected to the end of the constant column "C". It includes a casing 55 having a front closure plate 56 secured thereto by screws 57, and a rear closure plate or block 58 which is inserted from the front and then secured to the back of the casing by screws 59.

The block 58 has an inner dish-shaped surface 60 designed to cooperate with a diaphragm 62 to form a pumping chamber 63. The marginal area of the diaphragm, which is formed of any suitable flexible sheet material, is secured by a ring 64 and screws 65 to the outer edge of the block. When the flexible central portion of the diaphragm is reciprocated in a manner presently to be described, air will be drawn into the chamber 63 through a port 66 which opens to the atmosphere and will be discharged into a pair of passageways 67 formed in the block 58 and designed for individual communication with the respective pipe lines 25 and 26. The intake port 66 is controlled by a reed valve in the form of a flexible rubber disc 68 or the like having one edge fastened to the chamber surface 60 so that when pressure is developed in the chamber the valve will flatten out and cover the port but will be drawn inwardly to uncover the port on each suction stroke of the diaphragm.

The block 58 is provided with a pair of parallel vertical chambers 69, the lower ends of which open into the discharge passageways 67 and the upper ends of which are threaded to receive hollow coupling members 70 that serve to connect the chambers with the pipes 25 and 26. Each chamber contains a mercury valve comprising a liner 72 partially filled with a small quantity of mercury 73, and a valve element 74a in the form of a porous cylinder which snugly fits in the bottom of the liner with its upper surface supporting the mercury. The element 74a may be formed from any suitable porous material, such as felt or stone, which will permit the passage of air but which will prevent the passage of mercury at low pressures. The ends of the liner are gasketed and the assembly clamped tightly in the lower cylindrical portion of the chamber by a hollow plug 76, so that all air flow between the passages 67 and pipes 25, 26 must take place through the porous material and the body of mercury.

As indicated above, the porosity of the elements 74a must be such that they will pass air that is discharged from the pump, but will not receive mercury and permit it to descend from the liners into the passageways 67. The suction valve 68 opens readily so that there is no great tendency to draw the mercury into the pump chamber. The mercury of course seals the pump against the return of air from the pipes 25 and 26, although the primary purpose of the mercury is to effectively seal the pipes 25 and 26 against inter-communication which, if permitted, would tend to equalize the pressures at opposite ends of the differential gauge. A second porous element, 74b, is fitted in the upper end of each chamber 69 and held to shape and in position by a washer 75. The elements 74b which may be duplicates of the elements 74a, will pass air but will prevent the mercury from going into the pump discharge lines.

Two separate pumps for the individual lines 25 and 26 may be used if desired, but where a single pump is used to purge both lines, it naturally follows that two distinct discharge valves will be employed.

The pump diaphragm 62 may be actuated at will by energizing the circuit of a small electric motor of the vibrating or solenoid type. This motor comprises a coil 77 wound upon a core 78 between two plates 81 and 79 and fitted within a cup-shaped steel housing 80 that is arranged centrally of the pump casing and rigidly secured to the cover plate 56 by riveting one end of the core 78; a steel disc 82 secured centrally to the diaphragm by a rivet 83 and designed to move toward the housing 80 when the coil is energized; a compression spring 84 surrounding the housing and reacting between the cover plate 56 and the disc 82 to thrust the latter rearwardly upon interruption of the current through the coil 77; and a circuit making and breaking mechanism including a lug 85 secured to the disc 82 and designed to engage a breaker element 86 at the end of each forward stroke of the disc and diaphragm assembly. The circuit, which is of a conventional type is closed again as the spring causes each discharge stroke of the diaphragm.

The feed line for the circuit is controlled by a switch-actuating button or pin 89 which projects forwardly through the cover plate 56 to one side of the electric motor. By depressing this pin, the circuit can be closed and the pump operated until the pin is released. Any suitable spring means (not shown) may be employed to cause the pin to open the circuit. The pump is set into operation manually just before the gauge is read, and is permitted to operate only for the short period of time necessary to purge the lines 25 and 26.

A silencing sheath 87 of relatively soft and preferably anti-frictional material is disposed between the steel housing 80 and the compression spring, one end of this sheath being turned inwardly adjacent the disc 82 so as to cushion the latter at the end of its suction stroke. The high speed pump therefore operates quietly at all times.

The smooth annular groove 88 on the disc surface enhances the flexibility of the rim portion of the diaphragm and lengthens the life of the latter.

The pump and gauge mechanisms could of course be readily incorporated in a single housing, but preferably they form separate instruments mounted closely adjacent each other, somewhat as shown in Figure 2. The rim of the pump housing assembly may be provided with spacing washers 90 and bolt-holes 92 adapting it for support against the face of a panel such, for example, as the concealed face of an automobile dashboard. When so mounted, the pump will be concealed but its actuating pin 89 will project through the panel for convenient manipulation.

The above described indicating system and its major parts are trouble proof and useful in association with all types of battery power plants, both portable and stationary, and are also capable of many other uses in combination with apparatus involving liquids which may vary in density. The material under observation need not be a pure liquid, as obviously any material which has the property of fluency will work satisfactorily in the system.

In case the system involves the storage battery of an automobile, it is highly desirable to provide liquid level indications as well as specific gravity indications since the average automobile driver is careless in the maintenance of a proper electrolyte level and it is from this source that most of his battery troubles arise. It would, of course, be a relatively simple matter to provide separate and distinct devices for observing the level and the specific gravity, but is preferable to devise a single combination or system involving few or no duplicated parts. To this end we have devised the arrangement seen in Figure 9, which is illustrative of one of several ways of obtaining a compact and inexpensive combination system.

The system of Figure 9 comprises a battery unit 200, similar to the unit 20 of Figure 2; a single-acting low-pressure gauge 130, preferably of the diaphragm type, to take the place of the double-acting gauge 13 of Figure 2; a pair of conduits 93 and 94 connected between the battery unit and the supply line 95 of the gauge; a purging pump 240 designed to force air through the conduits 93 and 94 by way of pump discharge lines 96 and 97 respectively; and a valve 98 having a manually operable handle 99 for selectively placing the pressure-responsive element of the gauge in communication with either the conduit 93 or the conduit 94, depending upon whether a specific gravity or a level reading is desired.

The battery unit 200 consists of a composition plate having an internal well 270 which is connected to the gauge only by an internal passageway 29, 32 extending between the lower closed end of the well and the pipe 93. The upper end of the well is open and in communication with the battery above the normal electrolyte level, but it is always maintained full of liquid to provide the constant head or column "C". This constant level of the liquid is maintained through the provision of a small flap or reed type valve 100 which is fitted on the inner surface of the well to cover a port 102 that interconnects the well and the outer surface of the battery unit. This valve, as more fully described in our above mentioned copending application, permits the liquid to surge into the well from the battery when the vehicle is stopped or started. The well might be kept filled in other ways such for example, as by permitting the battery liquid to splash or slop over from the battery into the upper open end of the well.

From the foregoing description, it will readily be appreciated that, with the valve 98 disposed to interconnect the lines 93 and 95, the head "C" will exert a gauge pressure that varies only in response to variations of the specific gravity of the liquid in the well.

The upper end of the well is open to the battery cell chamber by way of one leg 104 of a right-angular slot 103 that is formed transversely through the battery unit. The other leg, 105, of the slot is vertically arranged and in communication with a portion 106 of an internal passageway 107 at a point substantially below the normal liquid level. The passageway 107 opens into the conduit 94. The actual level in the leg 105 always represents the true electrolyte level existing in the battery cell, and therefore, when the valve 98 is positioned to interconnect the conduits 94 and 95, while simultaneously cutting off the line 93, any liquid level variations will be indicated by the pressure-responsive mechanism of the gauge.

In order to obtain an automatic purging of either conduit 93 or 94 as the selecting valve is manipulated from its broken line or neutral position to obtain a reading, a special circuit-closing button 108 is substituted for the member 89 of Figures 7 and 8, and the valve handle 99 is provided with a pin-like extension 109 designed for cooperation with this special button. As best seen in Figure 10, the button has two cam surfaces 110 interconnected by a U-shaped portion 112. When the extension rests within the U-shaped portion or beyond the ends of the cam portions, the button is in its outer or circuit-opening position, but when the extension is shifted across either cam portion, it causes depression of the button and closure of the circuit.

The gauge 130 is mounted in the instrument panel 113 with its dial member 114 and pointer 115 visible from the driver's seat of the vehicle. The dial member has "Level" and "Specific Gravity" scales, as shown, for cooperation with the pointer. In view of the fact that these scales necessarily take up only small parts of any dial that has a full length corresponding to a complete movement of the pressure-responsive mechanism between the minimum pressure developed by the liquid in the leg 105 and the maximum pressure developed by the constant column "C" at 1.300 specific gravity, the gauge must be of special design in order for both scales to be visible through a compact gauge face. For example, assuming that the high level in the leg 105 is 1" and the low level ½", the extreme pressure variation or range developed in the conduit 94 will be roughly from 0.021 pound per square inch to 0.042 pound per square inch under average specific gravity conditions. Now, assuming that the column "C" is 8½", the pressure variations in the conduit 93 will be between 0.337 to 0.399 pound per square inch. The gauge mechanism can be suppressed so that it fails to indicate unless its responsive element is subjected to at least 0.021 pound but if the pointer is to travel continuously from this point to the maximum pressure of 0.399 pound, it must during its travel move over a long blank dial area corresponding to the difference between the two scales, i. e., a blank area between 0.042 pound and 0.337 pound.

The above problem may be solved in several ways by special gauge design, and the illustrated solution consists in arranging the dial 114 in cylindrical form as shown in Figure 11, so that the two scales are in proximity for observation at the front side of the cylinder, with the long blank dial area occupying the invisible side and rear walls of the cylinder. Only the scaled portion of the dial is visible through the dash-board. The pointer 115 is L-shaped with its actuated end mounted on a vertical pivot 116 in the axis of the cylinder, so that the pointing portion of the pointer may swing over the entire cylindrical surface, including the scaled parts of the latter. When a level reading is taken the pointer will swing from a position, between the adjacent ends of the scales, to a part or full reading on the "Level" scale; and when a gravity reading is taken the pointer will take the same movement and in addition thereto a further oscillation carrying it over the invisible blank area and over part or all of the "Specific Gravity" scale. A stop pin 117 is secured to the dial to limit the maximum movement of the pointer in either direction. The valve 98 may be designed to open the pipe 95 to atmosphere when it is in its neutral position and thus ensure that the pointer will take a position between the two adjacent ends of the scales after each reading.

Obviously, the valve 98 may be eliminated and the conduits 93 and 94 connected individually to separate gauges each of which is especially designed to afford a particular scale. Although this arrangement requires two gauges it still permits the use of a common pump and a common battery unit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. For use in an indicating system embodying a gauge designed to afford indications of the condition of a body of liquid, a connection unit designed for insertion in the body of liquid, said unit comprising a flat comparatively thin body member having a substantially vertical liquid chamber and having a small horizontal internal passageway in direct intersection with said chamber at a point below the liquid level of the latter whereby said passageway is placed under pressure, said passageway being of considerable length, and means adapting said passageway for connection with the gauge.

2. A system for indicating certain conditions of the electrolyte of a storage battery, said system comprising a device incorporated in said battery to provide a constant height column of electrolyte and another column that is variable in length in accordance with changes in the level of the battery electrolyte, pressure-responsive indicating mechanism, and connections between said columns and said mechanism, said connections including passages provided by said device, and said pressure-responsive mechanism including means for providing readings of the specific gravity of the liquid in said constant height column and means for providing readings of the level in said variable column.

3. In a liquid condition indicating system having means insertible in the liquid to develop a fluid pressure that is above zero and that varies through a range which is relatively small when compared with the range between zero and the lower end of said variable range, a fluid pressure-responsive gauge for operative connection with the source of variable fluid pressure, said gauge having a scale corresponding with said variable range and a pointer for cooperation with said scale, said gauge embodying an element movable in response to variation in the pressures developed in said fluid and coupled to said pointer by lost-motion means, whereby said scale and pointer are relatively shiftable only when the fluid pressures transmitted to the gauge are greater than that at the lower end of said variable fluid pressure range.

4. In the system defined in claim 3, the pressure developed by said means being a differential pressure, and said gauge being of the differential type having two pressure-responsive elements.

5. In a system having a differential pressure indicator to indicate the condition of electrolyte of a wet battery, a unitary member adapted to be inserted in said battery, said member having an internal chamber open at the bottom to the electrolyte of said battery, a passage intersecting said chamber above the normal liquid level of the electrolyte in said battery whereby the electrolyte in said chamber will be under atmospheric pressure, conduits provided in said member and adapted to connect spaced points on said chamber with said differential indicator, and means for creating sufficient gas pressure in said conduits to cause some of said gas to be forced to bubble into said liquid whereby the pressure required to force air to bubble into said liquid will be proportional to the specific gravity of said liquid.

6. The combination as set forth in claim 5, in which said conduits are of minute cross section and intersect said chamber in substantially horizontal planes whereby air bubbles issuing from said conduits will not appreciably affect the differential fluid head produced between said spaced points.

7. A system for indicating the level and density of a body of liquid, said system comprising means forming a liquid chamber, indicating means, connections between said indicating means and the liquid of said chamber, said connections comprising gas filled conduits, a gas replenishing pump, selective means adapted to connect said pump to either of said conduits and automatic means responsive to actuation of said selective means to control said pump.

8. In a system for indicating the specific gravity and the level of a liquid, means insertible in the liquid to develop a pressure that is above atmospheric and that varies through a range which is relatively small when compared with the range between the atmospheric and the lower end of said variable range, a pressure responsive element for operative connection with the source of variable pressure, a scale having calibrations for specific gravity and liquid level indications, a pointer operatively connected to said pressure responsive element, said scale being so disposed relative to said pointer that the low end of said liquid level calibration is removed from the maximum end of said specific gravity calibration by substantially 360 degrees of the pointer movement.

9. The combination as set forth in claim 8, in which said scale is in the form of a circular cylinder.

10. A system for indicating the level and density of a body of liquid, said system comprising means forming a liquid chamber in said body of liquid, indicating means, connections between said indicating means and the liquid of said chamber, and selecting means for causing the indicating means to indicate in accordance with the level or density of said liquid, said indicating means comprising a pressure responsive device adapted to move a single pointer relative to a single fixed scale.

11. In an indicating system, an indicating device adapted to indicate a plurality of variables, the range of said variables being small as compared to the range of said indicating device, a circular cylindrical scale on which the calibrations of said variables are carried, a pointer adapted to move relative to said scale and rotate through substantially 360 degrees in response to said variables, the calibrations on said scale being located adjacent the ends of said pointer movement whereby all of the calibration of said scale can be seen from a point substantially opposite the maximum position of said pointer.

12. In a system for indicating the condition of the electrolyte of a wet battery, a ported member adapted to be at least partially submerged in the electrolyte, said member having a vertically disposed passage therein which communicates at its bottom and top with the electrolyte, said member having a substantially horizontally disposed passage therein which intersects said vertical passage adjacent the bottom of the latter, and means for passing a stream of gas through said horizontal passage into and upwardly through said electrolyte, whereby a sample which is truly representative of the condition of the entire body of electrolyte is circulated through said vertical passage.

13. In a system for indicating the condition of a wet battery, a body member adapted to be immersed in the electrolyte of the battery, said body member having means providing a vertical passage, the upper end of said vertical passage providing an overflow return to the electrolyte of the battery, automatically operable means connected with said vertical passage to maintain electrolyte therein at the level of said overflow return irrespective of changes of electrolyte level in the battery, a horizontal passage communicating with said vertical passage, a second horizontal passage communicating with the electrolyte of the battery and operable to have pressures developed therein which are substantially proportional to changes in level of the electrolyte, and pressure responsive indicating means connected to said horizontal passages and adapted to have the pressures developed in said passages impressed thereupon, whereby the specific gravity and electrolyte level of said battery may be visually indicated.

14. The device described in claim 13, wherein said pressure responsive indicating means comprises a single pressure responsive gauge and means for selectively connecting said horizontal passages thereto.

15. In a system for indicating the condition of the electrolyte of a wet battery, an elongated flat body member, said body member being adapted to be rigidly supported in said battery and be at least partially submerged in the electrolyte thereof, said body member having a substantially vertical passage provided therein and adapted to be connected to a pressure responsive gauge for indicating changes in pressure therein, said body member also having a horizontal passage provided therein and communicating with the lower end of said vertical passage, said horizontal passage being straight and of considerable length and being of comparatively small diameter, said body member being provided with a vertical chamber communicating at its top and bottom with the electrolyte of said battery for placing the end of said horizontal passage remote from said vertical passage in fluid communication with the electrolyte of the battery.

16. In a system for indicating the condition of the electrolyte of a wet battery, an elongated flat body member, said body member being adapted to be rigidly supported in said battery and be at least partially submerged in the electrolyte thereof, said body member having a substantially vertical passage provided therein and adapted to be connected to a pressure responsive gauge for indicating changes in the pressure therein, said body member also having a horizontal passage provided therein and communicating with the lower end of said vertical passage, said horizontal passage being straight and of considerable length and being of comparatively small diameter, said body member also being provided with a second substantially vertical passage and a communicating horizontal passage, and a third substantially vertical passage communicating with both of said horizontal passages and placing them in communication with the electrolyte of the battery.

BERNHARD WILLACH.
EMERSON ASCHENBACH.
FRANK S. GRUVER.
MAXIMILIAN KLEIN.